July 11, 1961 M. SAVARIN 2,991,677
SLIDABLY ADJUSTABLE INNER JAW WRENCH
Filed Sept. 28, 1959 2 Sheets-Sheet 1
*Fig.1*
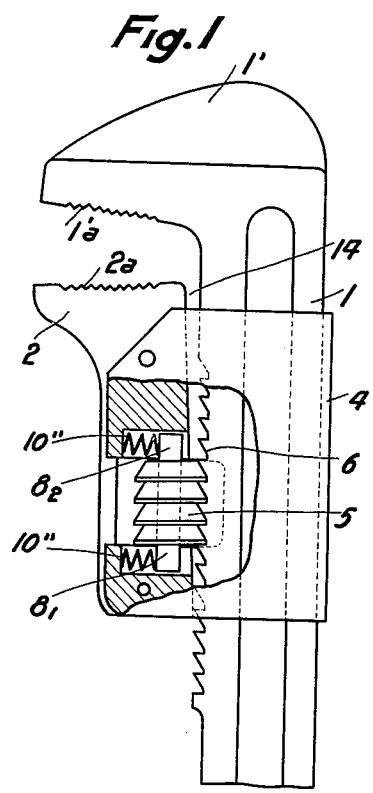
*Fig.2*
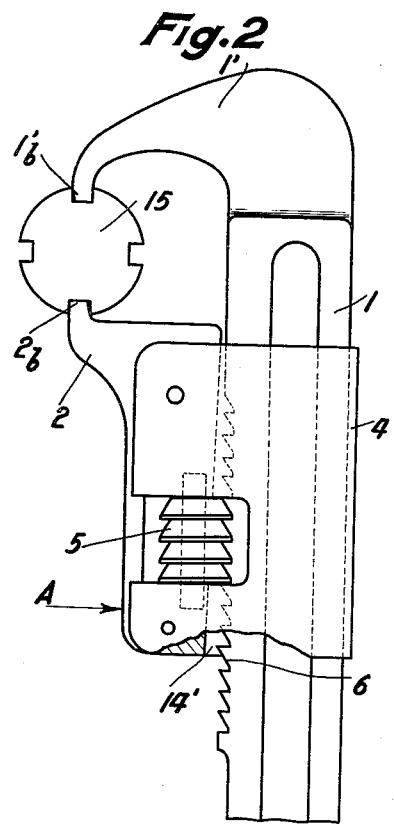
*Fig.3*
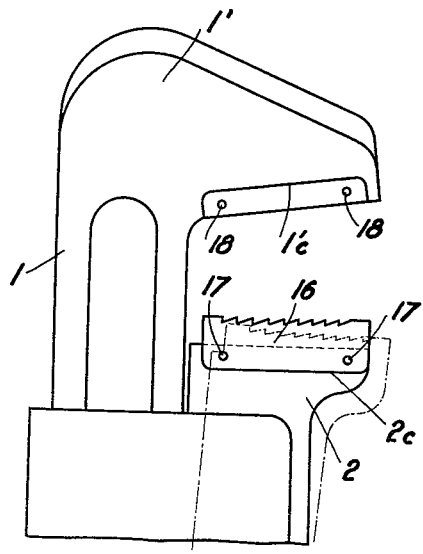
*Fig.4* *Fig.5*
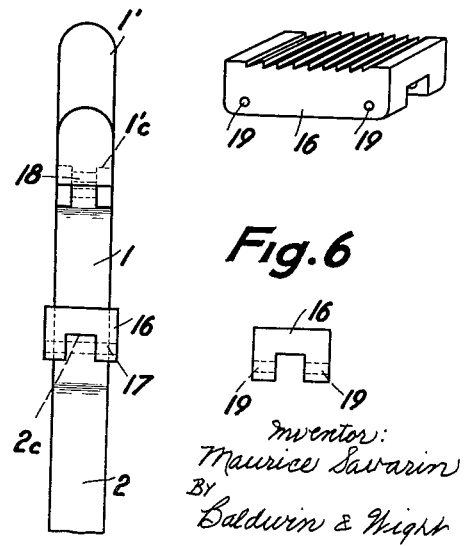
*Fig.6*
Inventor:
Maurice Savarin
By Baldwin & Wight
attorneys

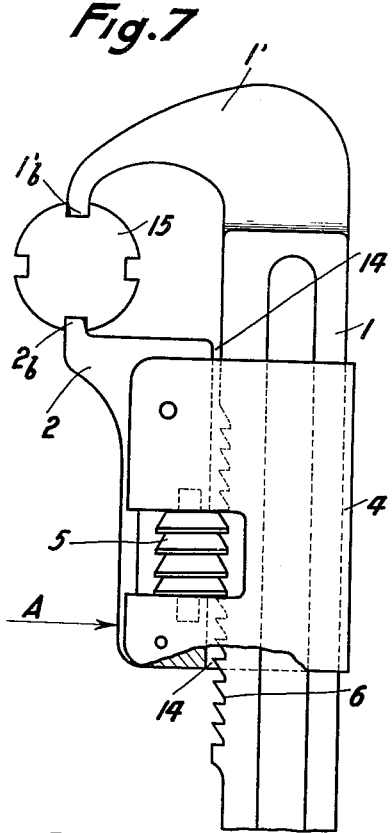
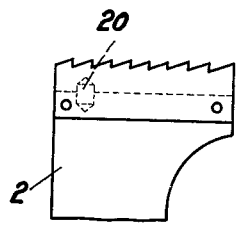
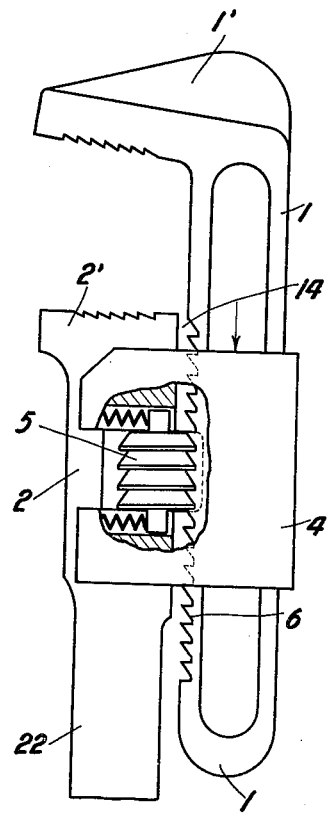
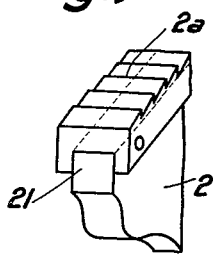
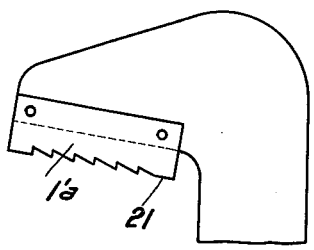

United States Patent Office 2,991,677
Patented July 11, 1961

2,991,677
SLIDABLY ADJUSTABLE INNER JAW WRENCH
Maurice Savarin, Paris, France, assignor to Societe Anonyme dite: Savarin & Veuve Foinant, Paris, France, a corporation of France
Filed Sept. 28, 1959, Ser. No. 842,827
Claims priority, application France Mar. 16, 1959
1 Claim. (Cl. 81—158)

The present invention relates to improvements in slidably adjustable inner jaw, i.e. spanner wrenches and more particularly to spanners of the rack type.

Shifting-spanners are already known in which the moving jaw is operated by means of a knurled nut with a sawtooth profile having a slope in the direction of closure and substantially at right angles with respect to the rack in the direction of resistance, and means for elastically urging the knurled nut into contact with the rack.

The said elastic means are preferably constituted by springs housed either between the knurled nut and the bottom of its housing in the moving jaw and acting on the extremities of the shaft of the knurled nut, or inside the nut between two sections of shaft which they separate from each other, or again inside the nut and forming themselves its shaft or rotation. Examples of these known constructions are shown in French Patent 1,182,603.

The present invention relates to spanners in which the gripping faces of the jaws are parallel and which are more particularly intended for screwing or unscrewing nuts, bolts, square-head or hexagon-head screws, coach-screws and all other objects of parallelepiped shape, and also to wrenches for pipes or other cylindrical objects and to hook spanners.

Constructions of this kind are of very great utility by reason of the rapidity with which the spanner can be adjusted to the object to be manipulated, and because of its particular feature of retaining its adjustment as long as the user may so desire.

In addition, the particular feature of the straight-line movement of the jaws is of very great advantage in the application of the method of rapid screwing and unscrewing by the use of hook spanners. In fact, it enables the spanner lugs to be normally presented to the exterior of a castellated or slotted nut, irrespective of the diameter. The lateral working faces of the lugs are for this reason in perfect contact with those of the slots on which the effort is applied.

This protects the nuts from any damage, an advantage which can only rarely be achieved with a spanner having fixed lugs, which seldom fits a nut or the like exactly by reason of the tolerance between the limiting diameters admissible for its use.

On the other hand, an adjustable hook spanner, in which the adjustment of the lugs is effected by pivotal movement about a single point is not rational. The rotation of the two arms carrying the lugs caused a variation of the angle at which the lugs are presented in front of the slots of the nuts, which are formed along the lines of extension each of the other, irrespective of the diameter of the nut, and therefore in a straight line. For lack of a suitable spanner, the workman is tempted to employ the standard method which consists in using a hammer and a cold chisel or a caulking chisel engaged in the successive slots, resulting in great damage to the nut.

Adjustable spanner wrenches constructed in accordance with the present invention avoid these shortcomings of the prior art.

In addition, the application of the invention to pipe-wrenches and to hook spanners makes it possible for users to employ these spanners in the same way as a ratchet-spanner.

Finally, the applicant considered that a very substantial economy could be obtained when certain parts of similar spanners and tools require to be changed as a result of damage, by making the active parts of the jaws movable and interchangeable.

In accordance with the present invention, a wrench construction enables rapid grip and release in which the operation of the moving jaw is effected by a knurled nut with a saw-tooth profile having a slope in the direction of closure and substantially at right angles with respect to the rack in the direction of resistance, and means for elastically urging the knurled nut against the rack. The spanner in accorlance with one aspect of the invention is characterised in that the moving jaw of the spanner is arranged so as to leave at its upper portion, in the case of a pipe-wrench or at its lower portion, in the case of a hook spanner, a clearance between the jaw and the rack handle, in such manner that the jaw and the cheek of which it forms part may be moved either by pivoting with respect to the handle or parallel to the said handle to free the object gripped, thus enabling the spanner to be turned around the object without turning it, so as to ensure a fresh grip and to effect a fresh rotation of the object in the same way as a ratchet driving device.

By virtue of the play or clearance left between the moving jaw and the handle, the pipe-wrench comprises a moving jaw having a gripping face which forms, with the gripping face of the fixed jaw, an angle which opens toward the exterior of the jaws.

The gripping faces of the jaws of the pipe-wrench embodiment of the invention are provided with peg-teeth or saw-teeth.

The fixed and movable jaws may be provided with hollowed portions into which fit movable and interchangeable jaw-pieces, toothed or without teeth, held on the jaws by means of pins which pass through the latter and the jaw-pieces.

The hook-spanner comprises jaws provided with lugs made in one piece with the jaws or added to the latter, either on their gripping faces or on one of their sides. The lugs face toward each other in a direction parallel to the direction of relative sliding adjusting movement of the fixed and movable jaw members. Consequently, the hook-spanner wrench may be applied to a device to be turned with the jaw lugs so positioned that a line connecting the lugs will pass through the center about which the device is to be turned, this line being parallel to the direction of relative sliding movement of the jaw members.

In addition, slip can be prevented by indented members which may be fitted in the corresponding jaw or may be keyed by a lug fitted in the jaw and in the corresponding element of the spanner, or again incorporated in the spanner by one of their parts projecting towards the rear of the added jaw-piece.

It has also been found that the shifting spanners embodying the invention may, with advantage, be provided with a handle formed by an extension of the movable jaw, the rack of the spanner being then located on the short portion forming part of the fixed jaw.

At the moment of gripping, the pivotal movement around one of the extremities towards the rack, and still further the total lateral movement of the jaw and of the saddle or strap coupling the two jaws together, make the instantaneous grip on nuts or tubes much more rapid and much easier.

In the accompanying drawings, there have been shown four forms of construction of a spanner in accordance with the present invention. In these drawings:

FIG. 1 shows a pipe-wrench seen in elevation with partial cross-section;

FIG. 2 shows a hook-spanner seen in elevation with partial cross-section;

FIG. 3 shows a profile view of a spanner with a removable jaw piece;

FIG. 4 shows a front view of the same spanner;

FIG. 5 shows a removable jaw piece in perspective;

FIG. 6 shows a front view of the same jaw piece;

FIG. 7 shows an alternative form of a hook-spanner seen in elevation;

FIGS. 8, 9 and 10 show various details of construction of pipe wrench removable jaw pieces; and FIG. 11 is a view in elevation of a modified pipe wrench construction.

There can be seen in FIG. 1 a rack-spanner comprising a handle member 1 with the fixed jaw 1' and a movable jaw member 2; a rack 3 being cut in the handle 1. A saddle or strap coupling 4 is riveted on the movable jaw 2; and a free space is formed in known manner between the jaw 2 and the saddle 4 to provide a housing for the knurled nut or screw 5.

The nut 5 and the rack 3 have a saw-tooth profile which has a slope 6 in the direction of grip; whereas in the direction of resistance, the profile of the knurled nut is substantially at right angles with respect to the rack 3.

In accordance with the invention, in such a rapid-grip spanner for manipulating tubes, unions and other cylindrical bodies (FIG. 1), the gripping faces of the fixed jaw 1' and of the movable jaw 2 are provided with teeth 1'a and 2a intended to act in opposition to the slip of the object to be gripped so as to turn it in the movement of rotation imparted to the spanner. The teeth do not have cutting edges and may be triangular (isosceles) or of saw-tooth form directed, in the case of the fixed jaw, towards the handle and, in the case of the movable jaw, towards the exterior.

In addition, the gripping faces of the two jaws 1' and 2 are not parallel like those of spanners for nuts and bolts, the gripping face of the movable jaw 2 being inclined with respect to the gripping face of the fixed jaw 1', and diverging from it towards the exterior, thus forming an angle in which the member gripped is held more and more tightly as it is further engaged in the jaws.

A relatively large transverse clearance 14 is left between the handle 1 and the upper part of the jaw 2. The coupling 4 engages the handle member 1 adjacent the lower end of the jaw member 2 in a manner to hold the members 1 and 2 closely adjacent one another with relatively small clearance between contiguous faces of the members.

A certain mobility of the assembly formed by the cheek 4 and the jaw 2 with respect to the handle is permitted by the elastic mounting of the knurled nut 5. Lugs or shaft extremities $8_1$ and $8_2$ of the knurled nut are constantly urged towards the handle by springs 10", and this mounting ensures a constant contact without play between the teeth of the knurled nut and those of the rack 6 formed along the handle 1.

The pressure of the springs 10" applied on the shaft extremity $8_2$ keeps the jaw away from the rack 6 by virtue of the clearance 14 left so as to permit a movement of the jaw.

The operation of the spanner is as follows.

In order to be able to grip the object which it is desired to turn, the knurled nut or screw 5 is moved away from from the rack 6 by hand, against the action of the springs 10", in order to render the movable jaw 2 and the cheek 4 free to slide so as to reduce or increase the opening between the two jaws so that the part can be inserted into the jaws.

The tube, for example, being placed in the opening, it is then only necessary, using a single hand (without touching the knurled nut), to apply pressure with the thumb on the base of the free jaw so as to move the latter toward the fixed jaw and grip the tube between the teeth of the two jaws, the saw-teeth of the knurled nut sliding over those of the rack and coming into engagement with the rack-teeth which are nearest to the working position. A slight rotation of the knurled nut is then effected if necessary in order to engage the teeth of the nut in the fully home position and in those of the rack.

It is then possible to turn the tube. Under the action of the turning effort, the movable jaw 2 can come closer to the rack, thus closing the wedge shaped opening between the two jaws and accentuating the grip of the tube. The same movement causes the nut 5 to be blocked between the rack and the vertical part of the jaw 2.

In the contrary movement, the lower part of the jaw 2 moves slightly away from the handle and enables a fresh starting position to be given to the spanner and a fresh turning action to be commenced just as if a ratchet device were employed.

It will be noted that the inclination of the teeth of the knurled nut 5 enables the latter to move away from the rack 6 when the jaw 2 is moved in the gripping direction, whilst force is exerted tending to move the jaw 2 in the opposite direction the nut offers the maximum resistance, and, in fact, prevents such movement.

In a further form of construction shown in FIG. 2, the system of rapid grip and release forming the object of the invention is applied to a hook-spanner.

In this form of construction, a clearance 14' is left between the lower part of the jaw 2 and the handle 1 so as to enable the assembly consisting of the jaw 2 and the cheek or strap coupling 4 to pivot with respect to the handle.

The two jaws 1' and 2 are shaped so that each comprises a lug 1'b and 2b respectively intended to engage in a slot, a hole or cavity formed in a member 15 gripped between the jaws in the manner described above.

The lugs may be formed in a single piece with the jaws. On the contrary, they may be removable and may be fixed on the jaws either by force fit or by screwing, either on the internal faces of the jaws, or on the sides of these latter.

If a nut with slots or castellations is to be gripped and turned the clearance 14' left between the jaw 2 and the handle enables a movement of the spanner in the direction opposite to that of gripping to cause the assembly of the jaw 2 and the cheek 4 to pivot with respect to the handle, so that the lug 2b will be freed from the slot or the castellation in which it was engaged. By continuing this movement and maintaining the spanner in contact with the periphery of the nut, the two lugs of the spanner will automatically repeatedly engage in the two following slots or castellations, and a further rotation of the nut can be effected in the desired direction.

The spanner then operates in the same way as a ratchet device and remains at the same adjustment without any intervention, the manipulation being carried out by a single hand.

By turning the spanner over it is possible to turn the nut in either direction.

It is clear that the springs 10" shown in FIG. 1 can be replaced by the various springs described and shown in French Patent 1,182,603 referred to above or by any other equivalent means.

It is also possible to reduce to a minimum the cost of spare parts by providing the fixed jaw 1' and the movable jaw 2 with removable jaw-pieces, either toothed or without teeth.

It is then only necessary, as shown in FIGS. 3 and 4, to form in the two jaws with recessed portions 1'c and 2c adapted to receive and to centre the movable and interchangeable jaw-pieces 16, whether these are toothed or not. The said jaw-pieces are preferably arranged so as to fit over each jaw, projecting on each side of the jaw.

By way of example, FIGS. 5 and 6 show a jaw-piece constructed in this way.

The jaw-pieces 16 are fixed on their respective jaws by means of pins 17 passing through holes 18 pierced in the jaws of the spanner and through holes 19 formed in the flanges of the jaw-pieces.

The removability of the jaw-pieces 16 makes it possible to use, for their manufacture, a steel of greater strength than that used for the manufacture of the other parts of the spanner.

In the alternative form of the hook-spanner shown in FIG. 7, a constant clearance 14 is left between the jaw 2 and the handle 1, so that the assembly of the jaw 2 and cheek 4 can move parallel to the handle.

FIGS. 8, 9 and 10 show various arrangements for preventing movement of the jaw-pieces 2a fixed on the jaw 2:

By a key 20 inserted partly into the jaw-piece 2a and in the member 2 or 1' of the spanner (see FIG. 8);

By inserting in the movable part of the spanner 1'—1 of a projecting portion 21 formed at the rear of the added jaw-piece 2a (FIGS. 9 and 10) or conversely, the groove formed in the jaw-piece, insertion in the body and in the jaw which are previously machined to house the cheeks of the jaw-pieces.

Finally, in FIG. 11 is shown a pipe-wrench in accordance with the invention with the constant clearance 14. In this case, the fixed jaw 1' is inclined on the body 1 of the spanner and the movable jaw 2 with the jaw-piece 2' and the elastically-mounted knurled nut 5, is extended by the handle 22 of the spanner. The rack 6 is formed in the body 1 of the spanner.

What I claim is:

A spanner of the class described having a handle shank and a jaw member slidable thereon, said shank at one end having a hook extending laterally from one longitudinal edge over the jaw member and toward the other end of the shank and terminating in a lug laterally remote to the longitudinal axis of the shank, said jaw member having a lug projecting beyond its margin in the opposite direction to and aligned with the first-mentioned lug on a line substantially parallel to said axis, said shank having rack teeth along said longitudinal edge, said teeth being defined by shoulders transverse to the shank and surfaces sloping downwardly from the outer extremities of said shoulders in a direction away from said hook and toward said other end of said shank, said jaw member having a recess therethrough bordered by walls transverse to said shank, which walls have slots with closed outer end portions, said slots opening into said recess and being open at their inner ends, a worm enmeshed with said teeth and having its thread conforming to the shape of said teeth, other lugs on the ends of said worm guided slidably and pivotally in said slots, spring means in said slots contacting their outer end portions and said other lugs to urge the worm into engagement with said teeth, and a saddle fastened to said jaw and surrounding said shank, said saddle being open at a portion thereof for access to said worm.

References Cited in the file of this patent

UNITED STATES PATENTS

| | | |
|---|---|---|
| 761,881 | Ernst | June 7, 1904 |
| 873,859 | Hachmann | Dec. 17, 1907 |
| 1,055,757 | King | Mar. 11, 1913 |
| 1,168,844 | Bartenstein | Jan. 18, 1916 |
| 1,386,229 | Belcher | Aug. 2, 1921 |
| 1,417,792 | Bartenstein | May 30, 1922 |
| 1,526,749 | Johnson | Feb. 17, 1925 |
| 1,652,977 | DeVilbiss | Dec. 13, 1927 |
| 1,736,303 | Becklin | Nov. 19, 1929 |
| 1,752,074 | Gagne | Mar. 25, 1930 |
| 2,420,458 | Barker | May 13, 1947 |

FOREIGN PATENTS

| | | |
|---|---|---|
| 406,991 | Italy | Aug. 9, 1944 |
| 715,971 | Germany | Jan. 10, 1942 |